(12) United States Patent
Taylor et al.

(10) Patent No.: US 10,425,331 B2
(45) Date of Patent: Sep. 24, 2019

(54) PRE-ROUTING DEVICE FOR DATA CENTERS

(71) Applicant: Facebook, Inc., Menlo Park, CA (US)

(72) Inventors: Jason Taylor, Berkeley, CA (US); Hans-Juergen Schmidtke, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/725,239

(22) Filed: Oct. 4, 2017

(65) Prior Publication Data
US 2019/0104062 A1 Apr. 4, 2019

(51) Int. Cl.
*H04L 12/741* (2013.01)
*H04L 29/06* (2006.01)

(52) U.S. Cl.
CPC .............. *H04L 45/74* (2013.01); *H04L 69/22* (2013.01)

(58) Field of Classification Search
CPC .................................. H04L 45/74; H04L 69/22
See application file for complete search history.

(56) References Cited

U.S. PATENT DOCUMENTS

| | | | |
|---|---|---|---|
| 5,629,836 A | 5/1997 | Wright et al. |
| 5,729,752 A | 3/1998 | Snider et al. |
| 5,997,326 A | 12/1999 | Koradia et al. |
| 6,373,713 B1 | 4/2002 | Jensen et al. |
| 6,381,146 B1 | 4/2002 | Sevier et al. |
| 6,422,876 B1 | 7/2002 | Fitzgerald et al. |
| 6,637,846 B2 | 10/2003 | Yang et al. |
| 6,814,582 B2 | 11/2004 | Vadasz et al. |
| 7,050,307 B2 | 5/2006 | Doblar et al. |
| 7,092,642 B2 | 8/2006 | Way et al. |
| 7,435,095 B1 | 10/2008 | Yi et al. |
| 8,154,867 B2 | 4/2012 | Shearman et al. |
| 9,136,624 B1 | 9/2015 | Reynov et al. |
| 9,686,886 B2 | 7/2017 | Okada et al. |
| 2003/0080568 A1 | 5/2003 | Busby et al. |
| 2004/0002237 A1 | 1/2004 | Doblar et al. |
| 2004/0047128 A1 | 3/2004 | McClelland, II et al. |
| 2005/0207134 A1 | 9/2005 | Belady et al. |
| 2006/0049727 A1 | 3/2006 | Corsini et al. |
| 2006/0121421 A1 | 6/2006 | Spitaels et al. |
| 2007/0184676 A1 | 8/2007 | Minich et al. |
| 2011/0013348 A1 | 1/2011 | Seibold et al. |
| 2012/0120596 A1 | 5/2012 | Bechtolsheim et al. |
| 2013/0083798 A1* | 4/2013 | Lakshmanamurthy ..................... H04L 69/22 370/392 |

(Continued)

OTHER PUBLICATIONS

U.S. Appl. No. 15/716,454 by Schmidtke, K. filed Sep. 26, 2017.

(Continued)

*Primary Examiner* — Lakeram Jangbahadur
(74) *Attorney, Agent, or Firm* — Van Pelt, Yi & James LLP

(57) ABSTRACT

Data center systems are described. A router can receive a data packet having a header indicating the destination for that data packet. That router can then route the data packet to another, second router. The routers can consider different portions of the header when making their routing decisions. For example, the different portions can be different sizes to allow for the first router to perform less complex routing decisions while the second router can perform more complex routing decisions.

10 Claims, 6 Drawing Sheets

(56) References Cited

U.S. PATENT DOCUMENTS

| | | |
|---|---|---|
| 2013/0337665 A1 | 12/2013 | Cohen et al. |
| 2014/0098492 A1 | 4/2014 | Lam et al. |
| 2014/0206273 A1 | 7/2014 | Larsen et al. |
| 2014/0307400 A1 | 10/2014 | French et al. |
| 2014/0362874 A1 | 12/2014 | Nishimoto |
| 2015/0229438 A1 | 8/2015 | Le Taillandier De Gabory et al. |
| 2016/0077556 A1 | 3/2016 | Yang et al. |
| 2016/0128230 A1 | 5/2016 | Dogruoz et al. |
| 2016/0197679 A1 | 7/2016 | Takahara et al. |
| 2016/0285758 A1* | 9/2016 | Uchibori ................. H04L 45/58 |
| 2017/0245030 A1 | 8/2017 | Lyubomirsky |
| 2017/0257315 A1* | 9/2017 | Johnsen ................. H04L 45/04 |
| 2017/0329371 A1 | 11/2017 | Schmidtke et al. |
| 2017/0331766 A1 | 11/2017 | Schmidtke et al. |
| 2017/0332506 A1 | 11/2017 | Schmidtke et al. |
| 2017/0332518 A1 | 11/2017 | Schmidtke et al. |
| 2017/0332519 A1 | 11/2017 | Schmidtke et al. |

OTHER PUBLICATIONS

Non-Final Office Action dated Aug. 29, 2017 for U.S. Appl. No. 15/291,293 by Schmidtke, H., et al., filed Oct. 12, 2016.
Non-Final Office Action dated Jun. 15, 2017 for U.S. Appl. No. 15/338,255 by Lyubomirsky, I., et al., filed Oct. 28, 2016.
Notice of Allowance dated Jul. 3, 2017 of U.S. Appl. No. 15/291,313 of Schmidtke H., et al., filed Oct. 12, 2016.
U.S. Appl. No. 15/291,263 by Schmidtke, H., et al., filed Oct. 12, 2016.
U.S. Appl. No. 15/291,293 by Schmidtke, H., et al., filed Oct. 12, 2016.
U.S. Appl. No. 15/291,313 by Schmidtke, H., et al., filed Oct. 12, 2016.
U.S. Appl. No. 15/291,324 by Schmidtke, H., et al., filed Oct. 12, 2016.
U.S. Appl. No. 15/291,348 by Schmidtke, H., et al., filed Oct. 12, 2016.
U.S. Appl. No. 15/338,255 by Lyubomirsky, I., et al., filed Oct. 28, 2016.
U.S. Appl. No. 15/655,795 by Schmidtke, H. et al. filed Jul. 20, 2017.
U.S. Appl. No. 15/705,205 by Schmidtke, H. et al. filed Sep. 14, 2017.
U.S. Appl. No. 15/706,561 by Schmidtke, H. et al. filed Sep. 15, 2017.
Corrected Notice of Allowability dated Nov. 21, 2017 for U.S. Appl. No. 15/291,313 by Schmidtke, H., et al., filed Oct. 12, 2016.
European Perforators Association "The Advantages of Perporated Metals" Aug. 21, 2016, EUROPERF.
Non-Final Office Action dated Nov. 17, 2017 for U.S. Appl. No. 15/291,348 by Schmidtke, H., et al., filed Oct. 12, 2016.
Non-Final Office Action dated Nov. 24, 2017 for U.S. Appl. No. 15/291,263 by Schmidtke, H., et al., filed Oct. 12, 2016.
Notice of Allowance dated Dec. 6, 2017 for U.S. Appl. No. 15/291,293 by Schmidtke, H., et al., filed Oct. 12, 2016.

* cited by examiner

PRE-ROUTING DEVICE FOR DATA CENTERS

TECHNICAL FIELD

This disclosure relates to pre-routing data packets for data centers.

BACKGROUND

The cost, complexity, and power consumption of data centers has been steadily increasing over the years. This has been driven by several factors including the power requirements of fast switching ASIC switch and router chips, the costs of high speed optical interfaces, and the cooling infrastructure required to cool the fast server processors, switches, and routers. For example, the power requirements for networking devices in data centers (e.g., routers) which used to be approximately 5% is projected to approach 40% in a few years. This increase is because the processor chips in the routers have significantly increased in size and complexity and will continue to increase to keep up with the increasing speed requirements.

This massive data transfer including the latency and speed requirements has led to an evolution of the data center architecture from the hierarchical three-tier design including core routers, aggregation or distribution routers, and access switches, to a flat, non-hierarchical, topology where all devices are exactly the same number of segments away. This topology called "leaf-spine" leads to predictable and consistent amount of delay or latency between nodes. Although the leaf-spine data center topology is well-suited to cater for East-West traffic (data designed to travel inside the data center such as to storage elements), oversubscription of links may occur where more traffic is generated than can be aggregated onto an active link at a time. The leaf-spine architecture allows to more easily expand capacity as compared to the traditional hierarchical topology, by deploying additional spine switches and extending the uplinks to every leaf switch. However, this solution to overcoming oversubscription to cope with more East-West traffic leads to increasing cost, complexity, and power consumption in the data center.

DETAILED DESCRIPTION

Figure 1:
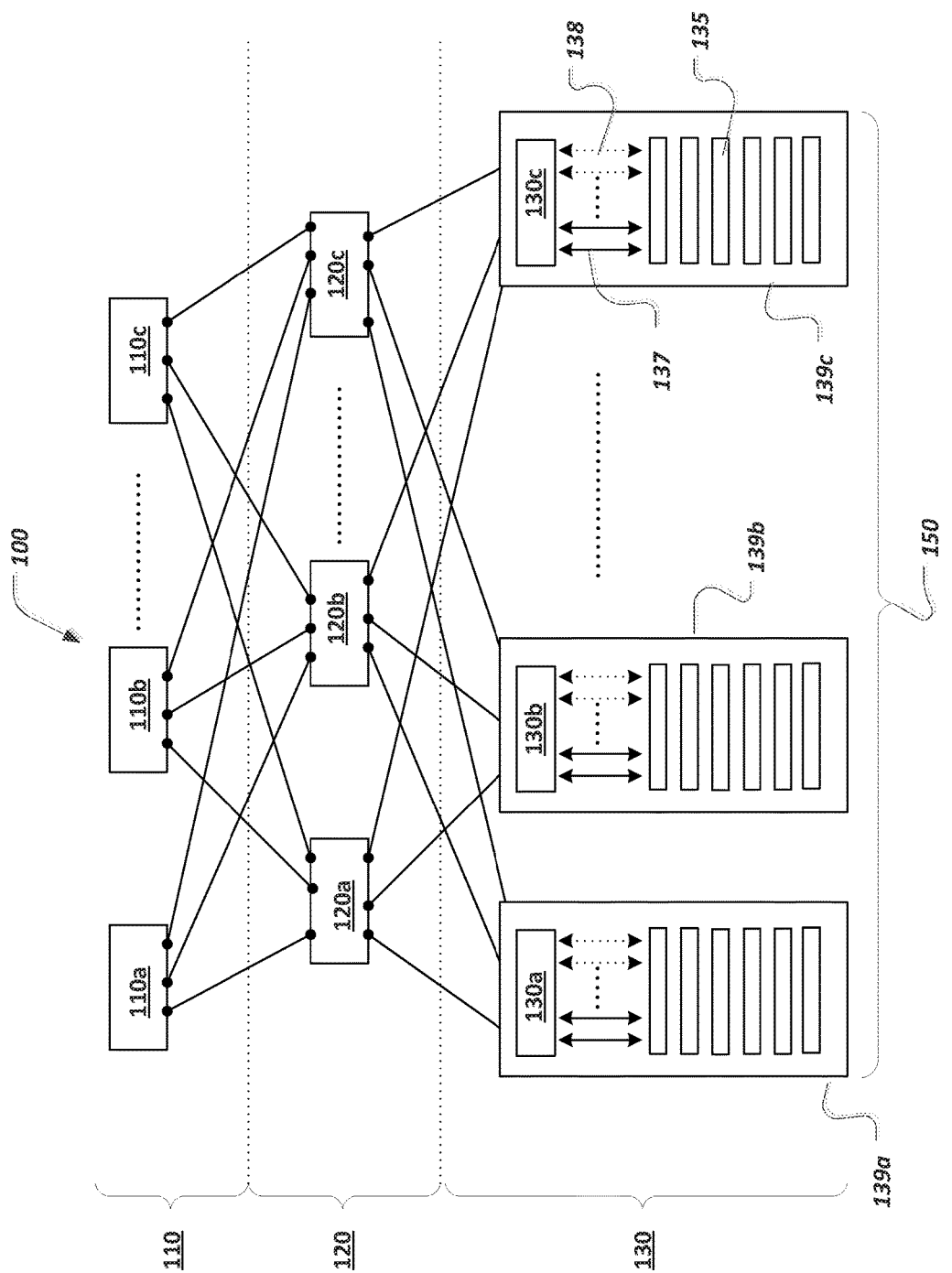
FIG. 1 is a representative network topology of a data center.

Some of the material described in this disclosure include systems and techniques for pre-routing data packets within a data center environment. In one example, a data center system can include routers arranged within different layers, or levels of a hierarchy. This results in some routers within a spine layer of the data center environment and other routers within a fabric layer of the data center environment. Routers within the spine layer can provide, or route, data packets to routers within the fabric layer. A router within the spine layer can provide a data packet to a specific router within the fabric layer based on a header of the data packet that provides some information regarding the destination for that data packet. For example, the router within the spine layer can receive a data packet at an input port, analyze the header to determine the intended destination for that packet, and then direct that data packet to one of its output ports so that it is propagated to another router. That other router that receives the data packet can then analyze the header to determine the next destination for the data packet.

The routers within the spine layer can be "lightweight" routers. That is, in comparison with the routers of the fabric layer, the lightweight routers of the spine layer can include different (e.g., fewer) functionalities, but can be more flexible and use less power. For example, the lightweight routers can route the data packets by considering less than the full amount of the header of a data packet that provides information regarding its destination. By contrast, the routers of the fabric layer can route the data packets using more of the header of the data packet. For example, the lightweight routers of the spine layer can consider a single bit of the header portion to determine where to send a data packet. When a routers of the fabric layer receives that same data packet, it can consider more of the header portion when determining where to send the data packet, for example, eight bits. Thus, the portion of the header considered by the lightweight routers of the spine layer can be a different size (e.g., smaller, fewer bits, etc.) than the portion of the header considered by the routers of the fabric layer or in a different position within the header. This allows for small, pluggable, lower power, and cheaper routers to provide a simplified "pre-routing" of data packets at one layer to make a simplified decision as to the general path to route a data packet, and more complex routers at the other layers to provide more complex routing. As a result, the complexity of the data center environment can be reduced, which in turn reduces the overall power requirements.

In more detail, various embodiments of the disclosed pre-routing device will now be described. The following description provides specific details for a thorough understanding and an enabling description of these embodiments. One skilled in the art will understand, however, that the pre-routing device may be practiced without many of these details. Additionally, some well-known structures or features may not be shown or described in detail so as to avoid unnecessarily obscuring the relevant description of the various embodiments. The terminology used in the description represented below is intended to be interpreted in its broadest reasonable manner, even though it is being used in conjunction with a detailed description of certain specific embodiments of the device.

FIG. 1 is a representative network topology of a data center 100 including a spine layer 110, a fabric, aggregation, or distribution layer 120, and a leaf layer 130. The spine layer 110 includes switching or routing devices, including device 110a, 110b, and 110c; the fabric layer 120 includes switching or routing devices, including device 120a, 120b, and 120c; the leaf layer 130 includes switching or routing devices, including device 130a, 130b, and 130c. The servers 135 are contained in server racks such as server rack 139a, 139b, and 139c. The server racks are arranged in a server cabinet row 150.

The spine layer 110 performs switching or routing using the spine layer devices such as 110a, 110b, 110c, and others. For example, data packets can be propagated through data center 100 by being directed by devices 110a, 110b, and 110c of spine layer 110 to devices 120a, 120b, and 120c of fabric layer 120. These spine layer devices are can be connected to a network external to the data center.

The fabric, aggregation, or distribution layer 120 performs switching or routing using the fabric layer devices such as 120a, 120b, 120c, and others. The fabric layer redundantly interconnects the leaf layer 130 devices to the spine layer 110 devices.

The switching devices in the leaf layer 130 can be located at the top of the rack (TOR) and connect to data center devices such as servers 135 through copper links 137 or fiber optic links 138. The switching devices in the leaf layer 130 may also connect to firewalls, load balancers, edge routers, and other devices such as client devices. It will be appreciated that the use of three devices in each layer above is only exemplary, and more devices could be added depending on the needs of the data center.

In a three-tier data center architecture, the spine layer 110 is also called the core layer, and the leaf layer 130 is also called the access layer. In two-tier data center topologies such as the leaf-spine architecture, the distribution layer 120 is merged into the leaf layer 130 and spine layer 110 such that every leaf layer device (130a, 130b, 130c, ...) connects to every spine layer device (110a, 110b, 110c, ...). In this case, the connection from each of the leaf layer 130 device to each of the spine layer 110 device could be either in layer 2 (i.e., switched) or in layer 3 (i.e., routed).

Figure 2:
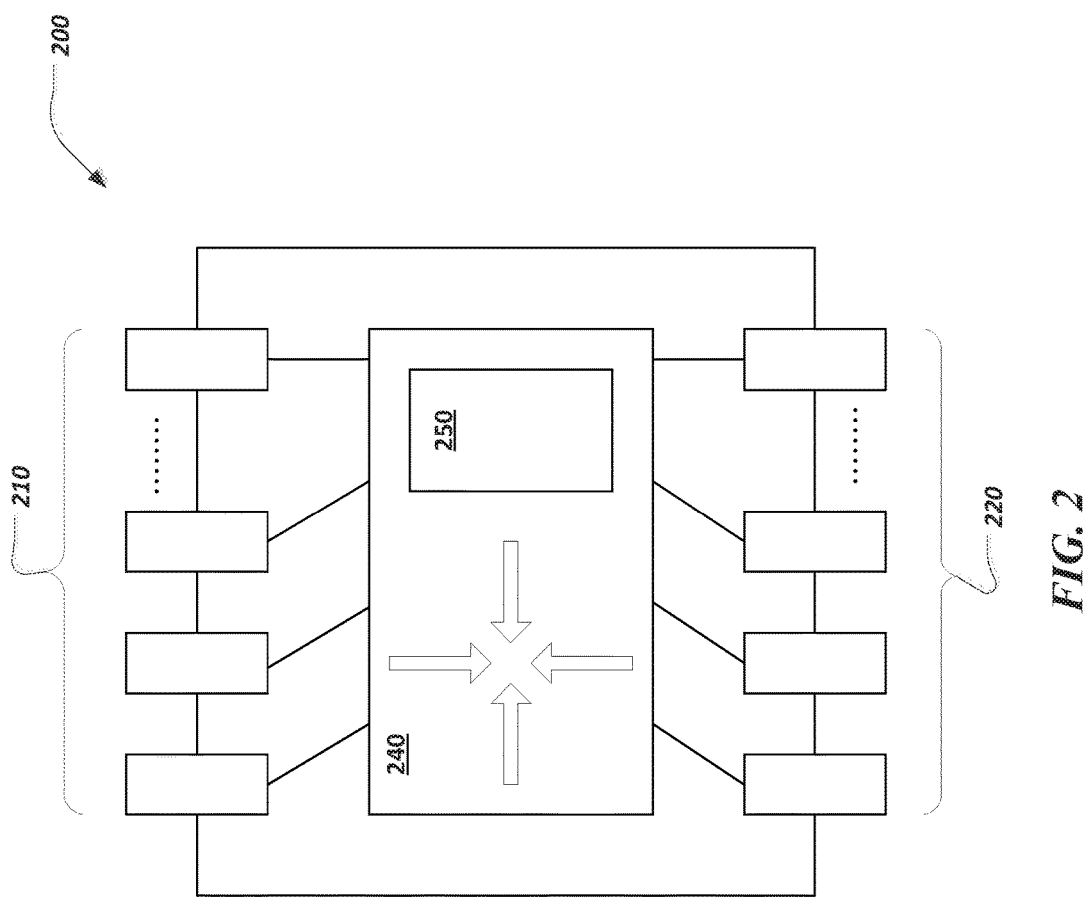
FIG. 2 is a representative block diagram of an exemplary pre-sorting router/switch device.

FIG. 2 is a representative block diagram of an exemplary lightweight pre-sorting routing or switching device 200. Device 200 is pluggable, modular, and scalable and includes a number of input-out (I/O) ingress ports 220 and egress ports 210. In some exemplary embodiments, device 200 may be viewed as a lightweight or barebones version of traditional switching or routing devices that may be found within the fabric/distribution/aggregation layer 120 or leaf/access layer 130. That is, device 200 might include less complex functionality than other switching or routing devices found within aggregation layer 120 or leaf/access layer 130. In other exemplary embodiments, device 200 is contained within a traditional switching or routing device to presort traffic for the switching or routing device. Device 200 includes a routing/switching engine 240 to perform a fast and truncated layer 2 switching or layer 3 routing using substantially less than the layer 2 or layer 3 packet header information (i.e., aspects of layer 2 or layer 3, respectively). For example, it may use only 1 or just a few bits of the destination information in the packet header where the destination information includes, for example, the destination IP address or the destination port number. In some exemplary embodiments, just 1 bit of a destination information is used to route the traffic either east or west. By contrast, the routers found within aggregation layer 120 or leaf/access layer 130 might use more bits of the destination information in the packet header to determine where to route the traffic. For example, the routers found within aggregation layer 120 or leaf/access layer 130 might use sixteen bits (e.g., either including or excluding the bits considered by device 200). As another example, device 200 might consider the first three bits, but the routers found within aggregation layer 120 or leaf/access layer 130 might consider the following seven bits. That is, device 200 and the routers found within aggregation layer 120 or leaf/access layer 130 might consider bits of the header within different positions when making their routing determinations.

The truncated routing/switching of device 200 is accomplished by the routing/switching engine 240 together with a memory 250 which includes look-up tables or forwarding tables representing or indicating the destinations for the few bits of the destination information considered by device 200. That is, different characteristics of the header and/or destination information can be considered by device 200 to determine where to route the data packets. Because of the truncated nature of the routing/switching only a small amount of memory is required in many exemplary embodiments. For example, this forwarding table memory element could store the mapping between the destination information in the packets' header and action the device should take such as whether a logic "1" in a certain bit position in the destination information corresponds to "eastward" routing or "westward" routing. Device 200 performs preliminary routing using a small portion of the packet information, and downstream routers act on the remaining portion of the packet information (e.g., more of the header corresponding to the destination information, as previously discussed) to determine the actual destination. For example, once the routing/switching engine 240 determines that the packet should be routed eastward, a router on the east would route to the eventual destination using the remaining portion of the packet header. In some implementations, to the routing corresponds to either layer 2 switching or layer 3 routing functions.

In some exemplary embodiments, device 200 is reconfigurable to enable routing/switching engine 240 (e.g., implemented by a controller or processor circuit) to perform different types of packet redirection. In such exemplary embodiments, a memory device such as memory 250 or some other storage device within device 200 can store the current configured routing/switching scheme. For example, device 200 may be configured to look at a variable number of bits in the packet header to pre-sort traffic. In one example, a controller circuit can provide information to device 200 (or multiple devices 200) to update memory 250 such that device 200 may be configured to only look at 1 bit of a destination information to determine if to route the packet eastward or westward; in another example device 200 may be configured to look at 2 bits of the destination information to determine if to route the packet in one of two eastward destination devices or in one of two westward destination devices for a total of four possible destinations. Thus, at one time, device 200 might only consider a single bit of the destination information, be reconfigured via the controller circuit, and then consider two bits of the destination information.

Device 200 may also include rules on which of the destination devices to send the packet to when more than one destination is possible. For example, when device 200 is configured to inspect 2 bits of the packet header and route the packet to one of two eastward routers/switches, it may select which one of the eastward routers/switches to send it to in a round-robin fashion; first match goes to router 1, second match to router 2, third match back to router 1, etc. Alternatively, in some exemplary embodiments, the selection of which router to send the packet to among a number of routers could be based on a preconfigured priority ordering which may bias some routers relative to others. For example, a priority routing scheme may configure device 200 to route every fourth match meeting the presorting criteria to router 1 and the rest of the matches to router 2.

In some exemplary embodiments, data center 100 may implement customized addressing based on, for example, the underlying applications running on the servers 135. This is particularly attractive when the same entity owns both the data center and the underlying applications and where the majority of the traffic within the data center is east-west (e.g., from servers to storage). The ability to customize the address space leads to a reduction in complexity of device 200 and in turn a reduction in complexity of routers and switches used with device 200. For example, the addressing may be customized such that a single bit position in the packet header informs the router/switch engine whether to route the packet eastward or westward.

It will be appreciated that device 200 is not limited to a specific layer 2 or layer 3 routing protocol, for example the OSPF (open shortest path first) protocol used for layer 3 routing in spine-leaf architectures or the STP (Spanning Tree Protocol). Device 200 need not be part of an interior gateway protocol (IGP). It may be used to shape or load balance the data center traffic. In some exemplary embodiments, device 200 may be used within a switch and use layer 2 tunneling protocol (L2TP). In some exemplary embodiments, device 200 may use MPLS (multi-protocol label switching) for load balancing using entropy labels to distribute the traffic on the router/switch board. It may include a pure MPLS device with simple overhead inspection, or perform segmented routing allowing for traffic steering. Device 200 may be used both for light weight overhead inspection to sort out traffic or for network sniffing, for example in an IPS (intrusion prevention system) or IDS (intrusion detection system) or a firewall.

In some exemplary embodiments ingress ports 220 and egress ports 210 may support copper or fiber-optic media. In other exemplary embodiments, device 200 may be silicon photonics based where data is transferred within device 200 by optical rays rather than electrical conductors. Thus, a silicon photonics device (e.g., semiconductor circuit) can be used to provide the routing functionalities of device 200. This allows for economical and fast pre-routing/pre-sorting which offloads and balances the traffic loads from downstream routers/switches.

Figure 3:
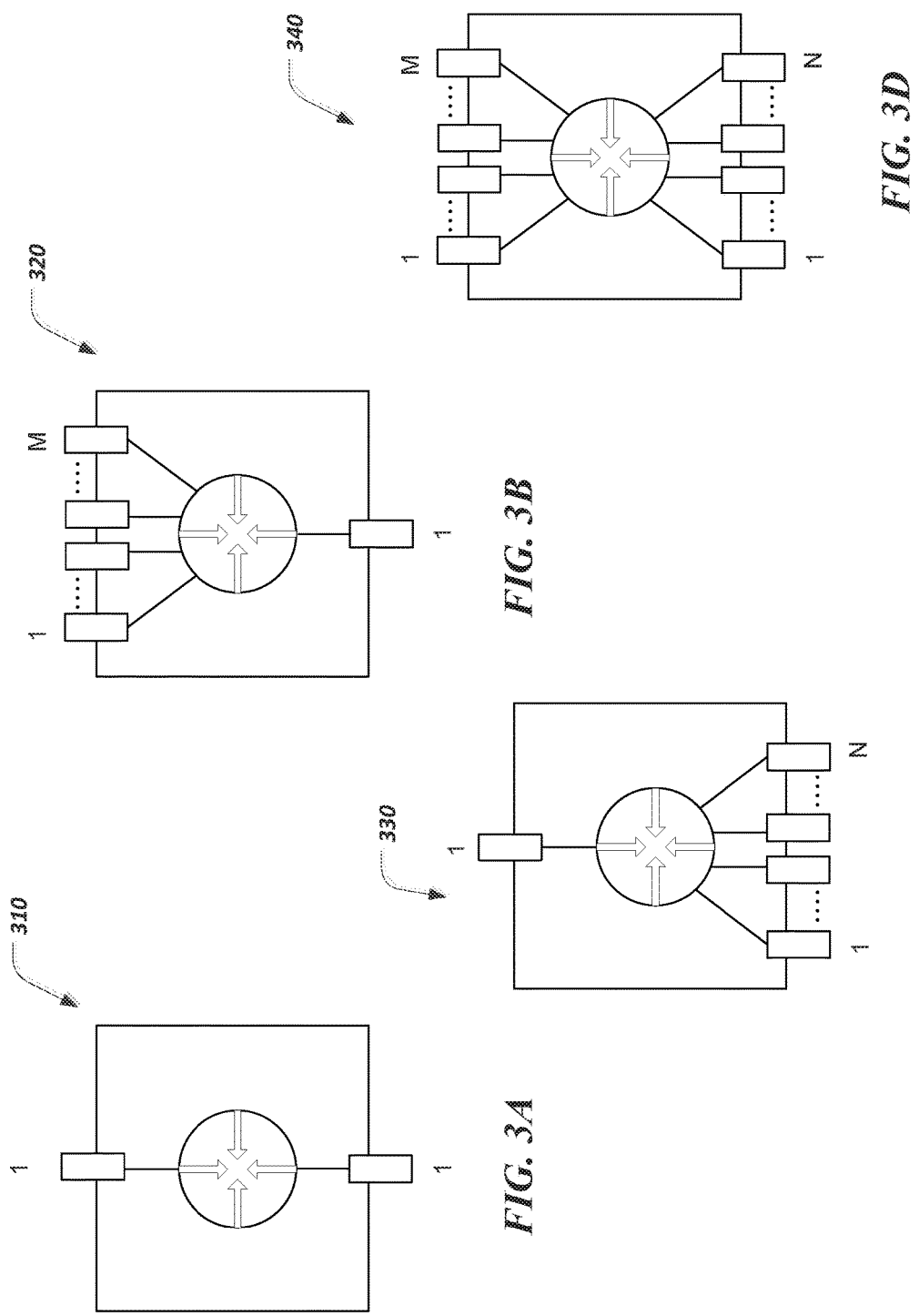
FIG. 3A is a representative block diagram of an exemplary pre-sorting router/switch device configured to ingress traffic from one ingress port and egress traffic from one egress port.
FIG. 3B is a representative block diagram of an exemplary pre-sorting router/switch device configured to ingress traffic from one ingress port and egress traffic from M egress ports.
FIG. 3C is a representative block diagram of an exemplary pre-sorting router/switch device configured to ingress traffic from N ingress ports and egress traffic from one egress port.
FIG. 3D is a representative block diagram of an exemplary pre-sorting router/switch device configured to ingress traffic from N ingress ports and egress traffic from M egress ports.

FIGS. 3A-3D are representative blocks diagrams of exemplary pre-sorting router/switch devices 200 configured for a variable number of ingress ports 220 and a variable number of egress ports 210. FIG. 3A shows an example of a device 310 configured to ingress traffic from one ingress port (e.g., receive a data packet at an input port) and egress traffic from one egress port (e.g., provide a data packet at an output port). FIG. 3B shows an example of a device 320 configured to ingress traffic from one ingress port and egress traffic from M egress ports. FIG. 3C shows an example of a device 330 configured to ingress traffic from N ingress ports and egress traffic from one egress port. FIG. 3D shows an example of a device 340 configured to ingress traffic from N ingress ports and egress traffic from M egress ports. The number of ingress and egress ports may be determined through software configuration of device 200 such as where a single physical port may be associated with multiple virtual ports. Additionally, the number of ingress and egress ports of device 200 need not match the number of ingress/egress ports of a router/switch device associated with device 200 (i.e., the post-sorting router/switch integrated on the same board as device 200 or otherwise downstream to device 200). For example, in some exemplary embodiments routing traffic from a QSFP28 transceiver may use a 4:1 ingress:egress configuration of device 330 and be further configured to select one of the 28 Gbps stream from the ingress port and route it to the egress port. Different configurations of devices 310, 320, 330, and 340 may be used to perform layer 3 inspection and routing per stream/wavelength or per fiber input.

Figure 4:
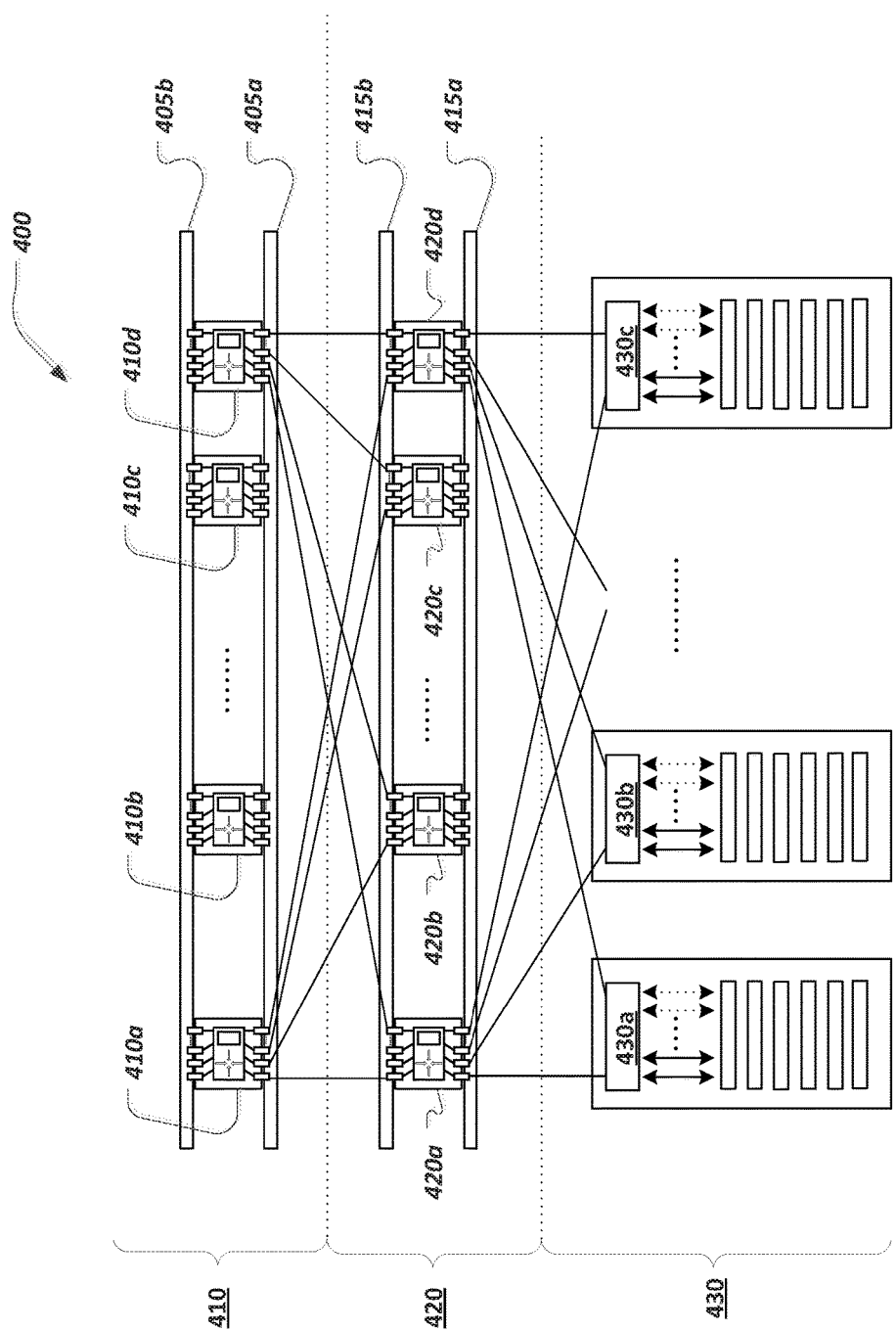
FIG. 4 is a representative data center architecture according to one exemplary embodiment.

FIG. 4 is a representative data center architecture 400 according to one exemplary embodiment. Data center 400 includes a spine layer 410, a fabric, aggregation, or distribution layer 420, and a leaf layer 430. The spine layer 410 includes switching or routing devices, including device 410a, 410b, 410c, and 410d; the fabric layer 420 includes switching or routing devices, including device 420a, 420b, 420c, and 420d; the leaf layer 430 includes switching or routing devices, including device 430a, 430b, and 430c. 405a is the input-out (I/O) layer associated with the ingress ports of the spine layer 410; 405b is the I/O layer associated with the egress ports of the spine layer 410; 415a is the I/O layer associated with the ingress ports of the aggregation layer 420; and 415b is the I/O layer associated with the egress ports of the aggregation layer 420. In a three-tier data center architecture, the spine layer 410 is also called the core layer and the leaf layer 430 is also called the access layer. On the other hand, in two-tier (non-blocking) data center topologies such as the leaf-spine architecture, the distribution layer 420 is merged into the leaf layer 430 and spine layer 410 such that every leaf layer device (430a, 430b, 430c, . . . ) may connect to every spine layer device (410a, 410b, 410c, 410d, . . . ).

Any or all of the devices in spine layer 410, fabric layer 420, or leaf layer 430 may incorporate pre-routing device 200. Even for a leaf-spine architecture, leaf or spine layer devices which include the pre-routing device 200 (or device 310, 320, 330, or 340) need not have a direct connection to each other because the pre-routing device may group the leaf/spine layer devices so as to reduce the interconnect complexity and large cable counts within the data center. In one example, spine layer 410 can include device 200 and the other layers (e.g., fabric layer 420 and leaf layer 430) can include more complex switches. For example, as previously discussed, device 200 within spine layer 410 can provide some pre-routing of data packets based on a smaller portion of the header indicating the destination information (or number of bits, different positions of bits, or other characteristics of the header and/or destination information as discussed herein) and the other routing/switching devices of the other layers can provide routing based on a larger portion of the header indicating the destination information. Thus, a quick and simplified routing can be first performed by device 200 to direct the data packets to more complex routing functionalities of the other routing/switching devices.

Figure 5:
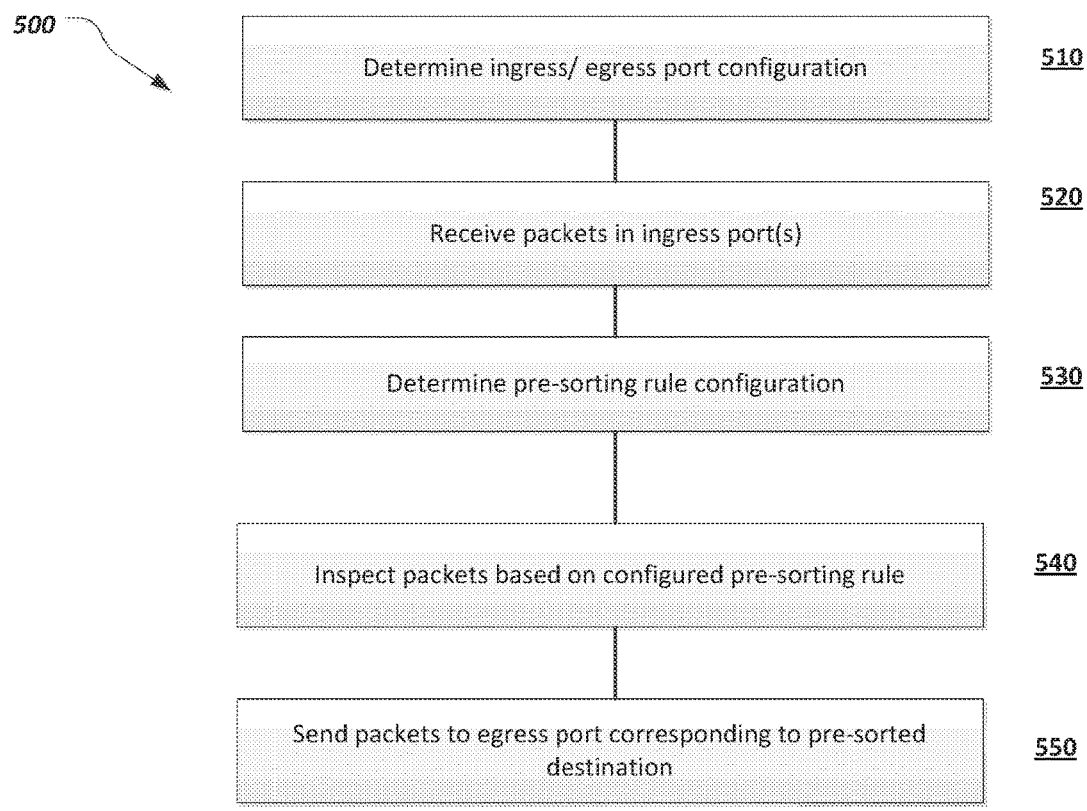
FIG. 5 is a representative flow diagram for routing traffic within a data center.

FIG. 5 shows an exemplary flow diagram 500 for routing traffic within a data center 400. At block 510 the routing/switching device which contains the pre-routing devices 200, 310, 320, 330, or 340 determines a configuration for the ingress and egress ports. For example, if a device 420a includes a total of M ports; at block 510 an ingress/egress configuration may configure the first N ports as ingress ports and the rest M-N ports as egress ports. At block 520, the pre-routing device 200 receives packets in the configured ingress ports.

At block 530, the pre-routing device 200 determines a pre-sorting rule configuration. Pre-sorting rules may include, for example, sorting based on protocol stack layer such as by sorting ingress port traffic via layer 2 or layer 3 header information. Pre-sorting rules may also include, for example, pre-sorting depth based on coarse or fine aggregation of downstream routers/switches. That is, the pre-routing device 200 may be configured to finely select the downstream device or broadly select a downstream device from a number of devices. This may be performed, for example, by determining how many bits of the packet header to inspect by accessing memory 250 to obtain the look-up tables or forwarding tables representing or indicating the destinations for the few bits of the destination information considered by device 200. An example of a coarse/broad pre-sorting may be a configuration where device 200 inspects only 1 bit from a packet header to determine if it should route the packet eastward or westward. For example, device 420a may be configured to route packets to either 410a or 410b when the inspected bit is logic 1, and to either 410c or 410d when the inspected bit is logic 0. An example of a fine/narrow pre-sorting may be a configuration where device 200 routes the packet to a specific downstream switch/router. In some exemplary embodiments an inspection of n bits of the header would result in $2^n$ possible aggregation levels of routing. In other exemplary embodiments, even more aggregation levels are possible because of the use of look-up tables indicating mappings to other groups. For example, a logic 1 in a packet header could map to a first row in look-up table which would indicate a routing to a certain subset of downstream routers/switches. The pre-sorting rules may also include how to select which downstream device within a group of downstream devices to route to. For example, if device 420a is configured to route packets to either 410a or 410b it may alternatively route to each of these device on every match or it may be more biased towards routing to one device versus another, or use any other formula to determine which device within the matched group gets the packets.

At block 540, the pre-routing device 200 inspects the packets received in the ingress ports in block 520 based on the pre-sorting rule determined in block 530. At block 550, the pre-routing device 200 sends the packet to the determined egress port corresponding to the determined destination determined using the pre-sorting rule in block 530.

The use of device 200 within the data center routers/switches, including when used in conjunction with customized address spaces, overcomes the problem with unconstrained connectivity required to handle east-west traffic which is particularly problematic for leaf-spine data center architectures. For example, rather than every leaf layer device (e.g., 410a, 410b, 410c, 410d . . . ) connecting to every spine layer device (e.g., 430a, 430b, 430c, . . . ), some exemplary embodiments may connect a group of leaf devices to a group of spine devices where one or more routers/switches with device 200s are interposed between each leaf and spine device to presort the traffic between the groups. Reducing the complexity and volume of traffic at each node allows for the use of less expensive and less power-hungry routing/switching devices or can lead for higher throughput and reduced latency.

The device 200's presorting/preliminary routing functions and its cascading modular design allows for data center topology optimization supporting software-defined networking (SDN) architectures. At blocks 510 and 530 in FIG. 5, device 200 may be dynamically reconfigured to presort traffic based on some criteria thereby allowing a network administrator to shape traffic from a centralized console without having to touch individual device 200s or spine and aggregation layer switches making up the control plane. Device 200 thereby allows for a flexible data center design and may be used to adapt traffic patterns particularly for non-block fabric architecture (leaf-spine architectures). In exemplary embodiments without reconfigurable ingress/egress ports or reconfigurable presorting rules, SDN programmability is not in software but the network topology is instead shaped by the modularity of the presorting/preliminary router than can be plugged in and out and reconfigured as needed. In some exemplary embodiments, the data center mixes and matches different presorting switch/router devices depending on network topology and underlying application data.

Device 200 as used in data center 400 with flow 500 has numerous benefits to the overall data center architecture. For example, they allow for small switches with focus on layer 2 (and "heavy weight") and intelligent termination points; allows for any combination of lighter and pluggable devices and "heavy weight" switches, even allowing for I/O layers without switches/router or fully equipped switches/routers; provides for better security appliances and termination because address resolution protocol (ARP) can be done in local pluggable devices. Additionally, device 200 allows for interoperability with existing or future pluggable optics standards which allows for a high degree of freedom to mix in new switching/optical technologies as they become available for the data center layers.

Figure 6:
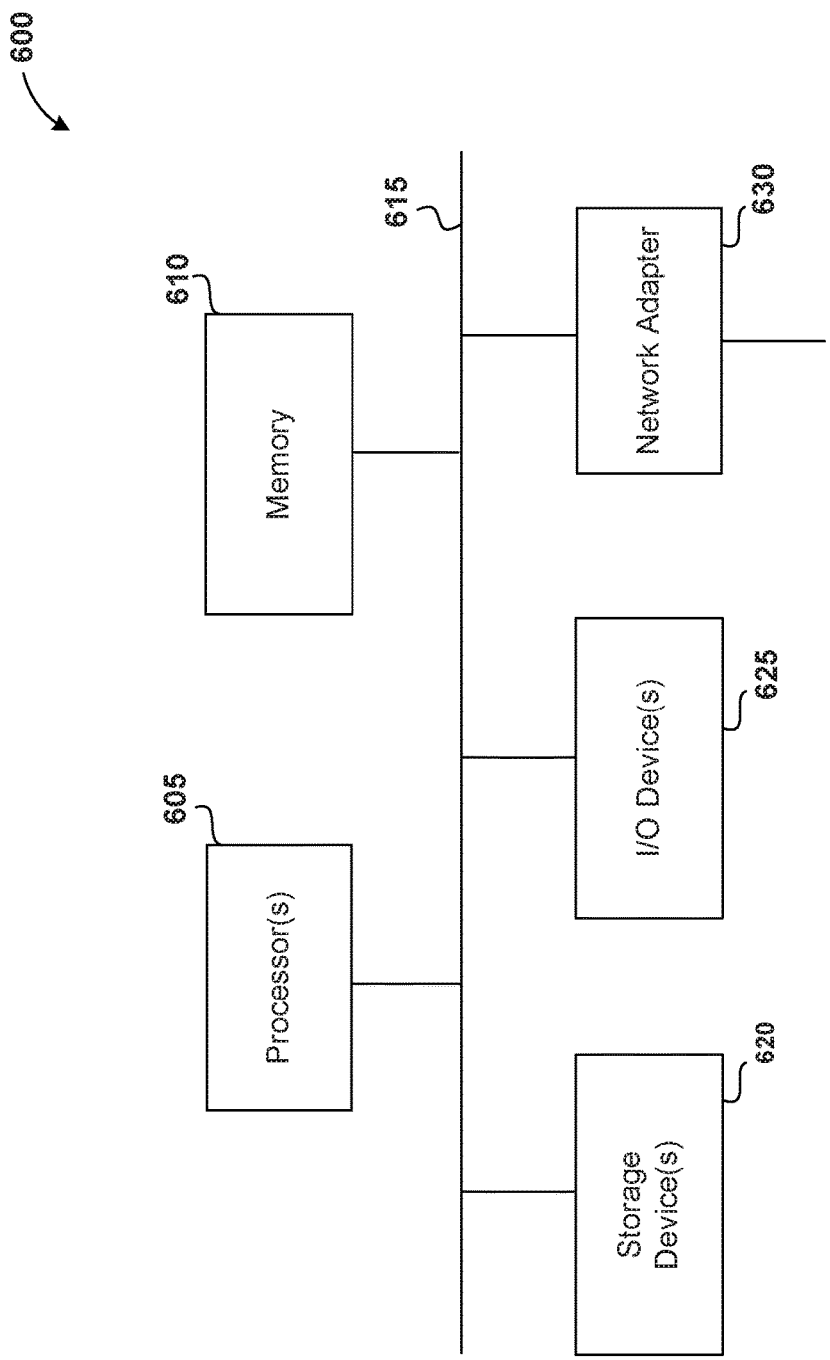
FIG. 6 illustrates an example computing device, consistent with various embodiments.

FIG. 6 is a block diagram of a computer system as may be used to implement features of some of the embodiments, for example, the functionalities and techniques of device 200, as described herein. The computing system 600 may include one or more central processing units ("processors") 605, memory 610, input/output devices 625 (e.g., keyboard and pointing devices, display devices), storage devices 620 (e.g., disk drives), and network adapters 630 (e.g., network interfaces) that are connected to an interconnect 615. The interconnect 615 is illustrated as an abstraction that represents any one or more separate physical buses, point to point connections, or both connected by appropriate bridges, adapters, or controllers. The interconnect 615, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called Firewire.

The memory 610 and storage devices 620 are computer-readable storage media that may store instructions that implement at least portions of the various embodiments. In addition, the data structures and message structures may be stored or transmitted via a data transmission medium, for example, a signal on a communications link. Various communications links may be used, for example, the Internet, a local area network, a wide area network, or a point-to-point dial-up connection. Thus, computer readable media can include computer-readable storage media (e.g., "non-transitory" media) and computer-readable transmission media.

The instructions stored in memory 610 can be implemented as software and/or firmware to program the processor(s) 605 to carry out actions described above. In some embodiments, such software or firmware may be initially provided to the processing system 600 by downloading it from a remote system through the computing system 600 (e.g., via network adapter 630).

While this patent document and attached appendices contain many specifics, these should not be construed as limitations on the scope of any disclosed methods or of what may be claimed, but rather as descriptions of features that may be specific to particular embodiments of particular disclosed methods. Certain features that are described in this patent document and attached appendices in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document and attached appendices should not be understood as requiring such separation in all embodiments.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A data center system comprising:
    a first router configured to receive a data packet having a header indicating a destination address for the data packet; and
    a second router, wherein the first router is configured to route the data packet to the second router based on a first portion of bits of the destination address by considering less than a full number of bits of the destination address, and the second router is configured to further route the data packet within the data center system based on at least a second portion of the bits of the destination address, the first portion of the destination address and the second portion of the destination address being different sizes;
    wherein the first router is a part of a first network layer of a plurality of hierarchical network layers of the data center system and second router is a part of a second network layer of the plurality of hierarchical network layers of the data center system, and the data packet is routed by the first router in the first network layer to the second router in the second network layer including by identifying the second router as a next destination of the data packed based on the first portion of bits of the destination address.

2. The data center system of claim 1, wherein the first portion of the destination address is smaller than the second portion of the destination address.

3. The data center system of claim 2, wherein the first portion of the destination address includes fewer bits than the second portion of the destination address.

4. The data center system of claim 1, wherein the first portion of the header includes bits at a first position within the destination address, and the second portion of the header includes bits at a second position within the destination address, the first position and the second position being different.

5. The data center system of claim 1, wherein the first router corresponds to a spine layer of the data center system, and the second router corresponds to a fabric layer of the data center system.

6. The data center system of claim 5, wherein the spine layer is coupled to a network external to the data center.

7. The data center system of claim 5, wherein the fabric layer couples a leaf layer to the spine layer.

8. The data center system of claim 1, wherein the first router includes a silicon photonics device to route the data packet.

9. The data center system of claim 1, wherein the first router is configured to route the data packet based on a layer 3 aspect of the data packet.

10. The data center system of claim 1, wherein the first router is configured to route the data packet based on a layer 2 aspect of the data packet.

* * * * *